(12) United States Patent
Varma

(10) Patent No.: US 6,546,806 B1
(45) Date of Patent: Apr. 15, 2003

(54) MULTI-RANGE FORCE SENSORS UTILIZING SHAPE MEMORY ALLOYS

(75) Inventor: Venugopal K. Varma, Knoxville, TN (US)

(73) Assignee: UT-Battelle, Oak Ridge, TN (US)

( * ) Notice: Subject to any disclaimer, the term of this patent is extended or adjusted under 35 U.S.C. 154(b) by 0 days.

(21) Appl. No.: 09/398,138

(22) Filed: Sep. 17, 1999

(51) Int. Cl.⁷ .................................................. G01B 7/16
(52) U.S. Cl. .......................................... 73/775; 73/766
(58) Field of Search ........................... 73/766, 862.046, 73/862.041, 862.38, 867.54, 862.59, 862.627, 760, 763, 774, 775; 177/210 FP, 229

(56) References Cited

U.S. PATENT DOCUMENTS

| | | | |
|---|---|---|---|
| 4,930,494 A | * | 6/1990 | Takehana et al. ............... 128/4 |
| 5,336,854 A | * | 8/1994 | Johnson .................. 177/210 FP |
| 5,631,861 A | * | 5/1997 | Kramer ....................... 364/406 |
| 5,780,746 A | * | 7/1998 | Brady .......................... 73/766 |

* cited by examiner

*Primary Examiner*—Max Noori
(74) *Attorney, Agent, or Firm*—Quarles & Brady LLP

(57) ABSTRACT

The present invention provides a multi-range force sensor comprising a load cell made of a shape memory alloy, a strain sensing system, a temperature modulating system, and a temperature monitoring system. The ability of the force sensor to measure contact forces in multiple ranges is effected by the change in temperature of the shape memory alloy. The heating and cooling system functions to place the shape memory alloy of the load cell in either a low temperature, low strength phase for measuring small contact forces, or a high temperature, high strength phase for measuring large contact forces. Once the load cell is in the desired phase, the strain sensing system is utilized to obtain the applied contact force. The temperature monitoring system is utilized to ensure that the shape memory alloy is in one phase or the other.

9 Claims, 4 Drawing Sheets

MULTI-RANGE FORCE SENSORS UTILIZING SHAPE MEMORY ALLOYS

CROSS-REFERENCE TO RELATED APPLICATIONS

Not Applicable

STATEMENT REGARDING FEDERALLY SPONSORED RESEARCH OR DEVELOPMENT

The disclosed invention was made with government support under contract DE-AC05-96OR22464, awarded by the United States Department of Energy to Lockheed Martin Energy Research Corporation. The United States Government has certain rights to this invention.

FIELD OF THE INVENTION

The present invention relates to force sensors. More specifically, the invention relates to multi-range force sensors manufactured with shape memory alloys to improve force measurement sensitivity.

BACKGROUND OF THE INVENTION

Robotic and industrial applications generate contact forces between themselves and the objects of their manipulation during the performance of their activities. These contact forces, typically include forces generated by the payloads and those generated during the alignment and attachment of parts during an assembly. A system of control is necessary to monitor these contact forces so as to allow adjustments to the robotic or industrial tool to quality performance or successful job completion. The control system used typically involves repositioning of the end effector during the application in response to force and torque measurements derived from a force sensor, or load cell. For example, in an assembly operation where a robotic manipulator is used to align or affix a part, a force sensor on the manipulator will measure the contact forces generated between the part and the assembled product. The manipulator will then use the force measurement to automatically align the part or release the part once it is in its desired position.

The most prevalent type of force sensor is the strain gauge load cell. The strain gauge load cell is a force sensor which utilizes strain gauges to measure the induced strain (flexure) placed upon a sensing element (load cell) by an applied force. The load cell serves as the reaction center for the applied force and functions by focusing the force into isolated and uniform strain fields where strain gauges are attached. The strain field, in turn, causes a change in the resistance across a strain gauge which is measured according to the modulation of an output signal across an electrical wheatstone bridge circuit, of which the strain gauge is a part. The output signal is then conditioned by dedicated electronic filters to eliminate any electronic noise, and gains are used in both computer hardware and software to obtain a measurable signal to determine the force, or load, applied during the application.

The ability of a strain gauge load cell to provide an accurate force measurement depends upon the sensitivity of the load cell to the applied force and the ability of the load cell to react to this force in a linear-elastic manner. The sensitivity of the load cell, in turn, depends upon the load cell's underlying elasticity which dictates the extent to which the load cell will react to the contact force and produce a measurable strain. Accordingly, a load cell designed to measure small contact forces is highly elastic and will allow flexure under minimal forces. A load cell designed to measure large contact forces, on the other hand, will allow flexure only under heavy forces and will have minimal strain under small forces. However, the low strain for small forces also limits the ability of the force sensor to measure small contact forces. In this case, the flexure induced by the small contact force is minimal and generates a change in resistance across the strain gauge which is too small for accurate measurement.

Robotic manipulators used in assembly operations, however, are generally required to carry varying payloads or carry out variable tasks which result in the generation of a wide range of contact forces. For example, the initial contact force applied to a robotic manipulator while grasping a part is generally much higher than the force required to insert and position the part during the assembly process. These contact forces need to be measured to allow precision robotic manipulations. Under the current technology, the measurement of these forces will require the use of many sensors having various capacities or measuring ranges.

One possible solution is to use a heavy force sensor and make adjustments in either the computer's software or hardware gains to obtain a full-scale reading of the electronic signal generated by the small contact force. Unfortunately, as the magnitude of the signal is improved, its accompanying noise is equally magnified, thus impairing an accurate reading. As such, increasing the gain will not improve the sensitivity of the heavy force sensor to measure small contact forces.

Other commercial sensors have attempted to overcome the problems associated with measuring forces over wide ranges by developing forces sensors which allow the interchanging of load cells within the sensor according to the applied load. For example, U.S. Pat. No. 5,471,885 describes a force sensor which utilizes freely interchangeable pre-calibrated load cells having various capacities. The pre-calibrated load cells are housed in a load cell module which is readily attached by screws to a display module which provides the measurement of the force applied to the load cell. The use of this technology requires an individual to physically detach the load cell from the display module and then attache a new load cell module having the desired capacity. In robotic and industrial applications, this is not practical.

The present invention uses shape memory alloys-to overcome the problems associated with measuring contact forces over extended ranges. Shape memory alloys are materials that exhibit a phase transformation and an accompanying mechanical property transformation dependant upon the temperature of the material. When the alloy's temperature is lowered below the alloy's martensite finish temperature, $T_{Mf}$, its particular crystal structure is changed, placing the alloy in a low strength state such that the alloy is more pliable. At this low temperature, low strength state the alloy is said to be in its martensite phase. Upon heating the alloy to its higher austenite finish temperature $T_{Af}$, the alloy reverses its crystal structure and manifests a memory effect by resuming its original shape imposed upon the alloy during a training phase. At this high temperature, high strength state the alloy is considered in its austenite phase. The transition of the alloy in moving from its martensite phase to its austenite phase is considered phase transformation. The shape that the alloy achieves during its austenite phase derives from the firing of the alloy in the shape at a temperature range well in excess of the $T_{Af}$. The temperature for this training phase will depend upon the particular properties of the material.

Shape memory alloys are known to have commercial use in force actuators, free-recovery mechanisms and proportional controllers. Actuators function by taking advantage of the shape change of the shape memory alloy during phase transformation. Actuators generally operate by deforming a shape-memory alloy while it is in its martensite phase and then heating the alloy to its austenite phase to recover all or part of the deformation, and in the process creating a motion of one or more mechanical elements. For example, U.S. Pat. No. 5,061,914 discloses the use of shape memory alloys in micro-actuators to open and close valves, move switches and providing motion for micro-mechanical devices. Likewise, U.S. Pat. No. 4,899,543 discloses the use of a shape memory alloy actuator as part of a clamping device to apply a compressive force on a work object while in an intermediate position under normal temperatures and then heating the actuator to extend the clamping device and release the compressive force.

Another device has taken note of the fact that the force generated by the actuator varies during its transformation phase and has attempted to measure that force according to the actuator's temperature and displacement. U.S. Pat. No. 4,579,006 discloses a force sensing means for an actuator which is made of a shape memory alloy. In this system, the actuator is coupled to a driver which is capable of heating the shape memory alloy of the actuator through its transformation phase so as to drive a load coupled to the actuator through a force transmission unit. A force sensing means is included which determines tensile force information according to a formula which considers the temperature or resistance of the actuator during its transformation phase and its displacement along the transmission unit.

Unfortunately, this system is not applicable to modern day robotic and industrial applications. For example, the disclosed sensing means is limited to only measuring tensile loads and is unable to measure compressive or shear forces. Moreover, this system is not adaptable to measure contact forces over a wide range of force levels with the requisite accuracy. The determination of the applied force is also dependent upon the analysis of the shape memory alloy while it is in the transition temperature range between the martensite and austenite phases such that the hysteresis experienced during phase transformation is likely to effect the reading of any force sensor output. Finally, the use of external contact and non-contact displacement sensors as suggested will require the use of bulky equipment which may be inappropriate for today's force sensors.

BRIEF SUMMARY OF THE INVENTION

It is an object of the present invention to provide a force sensor which is capable of measuring a wide range of contact forces without experiencing a reduction in sensitivity to low level contact forces.

It is another object of the present invention to provide force sensors which are small in size and light weight such that they are capable of use in several different applications, including modern day robotic and industrial applications.

It is yet another object of the present invention to provide force sensors capable of enduring shock loads or overloading.

These and other objectives are accomplished by the present invention. The present invention is summarized in that it provides a multi-range force sensor comprising a load cell made of a shape memory alloy, a strain sensing system, a temperature modulating system, and a temperature monitoring system. The ability of the force sensor to measure contact forces in multiple ranges is effected by the change in temperature of the shape memory alloy. The temperature modulating system functions to place the shape memory alloy of the load cell in either a low temperature, low strength martensite phase for measuring small contact forces, or a high temperature, high strength austenite phase for measuring large contact forces. Once the load cell is in the desired phase, a strain sensing system is utilized to obtain the applied contact force. The temperature monitoring system is utilized to ensure that the shape memory alloy is in one phase or the other.

In one embodiment of the present invention, the force sensor comprises a load cell made of a shape memory alloy, one or more thermoelectric devices for adjusting the temperature of the load cell, one or more thermocouples for monitoring the temperature of the load cell, and one or more strain gauges for measuring the applied contact force.

One advantage of the present invention is that it provides a force sensor which is capable of measuring a wide range of tensile forces, compressive forces and shear forces.

Another advantage is that the present invention provides a force sensor which is sensitive and highly accurate to low level contact forces while capable of providing precision measurements over a wide range of contact forces.

Yet another advantage of the present invention is that the force sensors maintain an inherent form of shock prevention in that the shape memory alloys utilized in the load cells have a unique propensity to return to their original state after experiencing deformation caused by shock loads or overloading. The recovery from the deformation arises by heating the alloy to its austenite phase and then cooling the alloy back to its martensite state.

Other objects, advantages and features of the present invention will become apparent from the figures and embodiments described below.

DETAILED DESCRIPTION OF THE INVENTION

In accordance with the present invention, the disclosed multi-range force sensor utilizing shape memory alloys eliminates the disadvantages and shortcomings of the presently existing force sensors. The key aspect of the invention is the use of a load cell made of a shape memory alloy which is capable of having its temperature adjusted to either its martensite phase to measure low level contact forces, or its austenite phase to measure larger contact forces.

Figure 1:
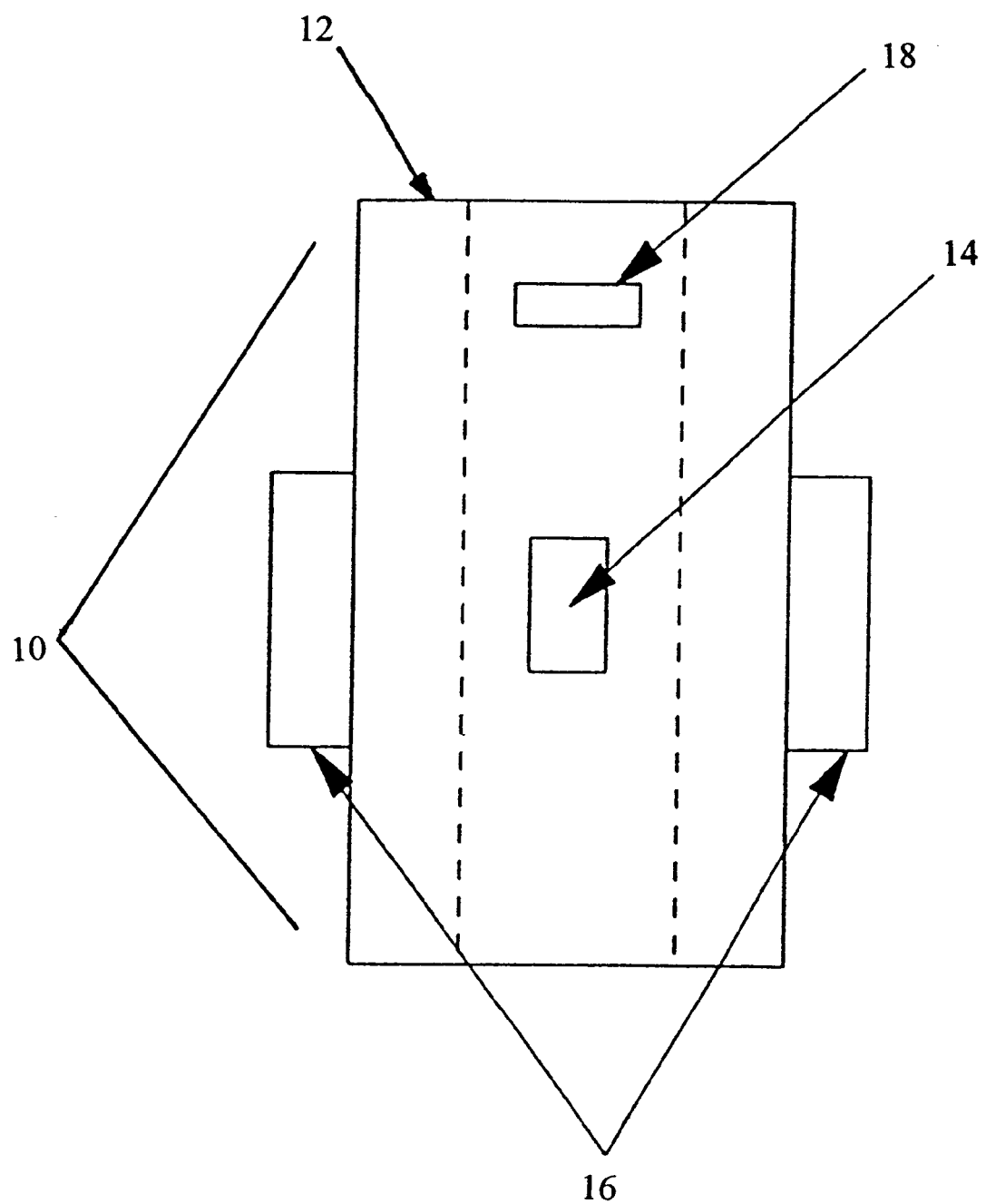
FIG. 1 illustrates a simplified form of a force sensor produced in accordance with the present invention.

FIG. 1 illustrates in simplified form one embodiment of a force sensor 10 according to the present invention. The primary elements of the force sensor comprise a load cell 12 made of a shape memory alloy, a strain sensing system 14, a temperature modulating system 16, and a temperature monitoring device 18. The strain sensing system 14 is attached to the load cell 12 in a manner which allows the measurement of an induced strain placed upon the load cell 12 by a contact force. The temperature modulating system 16 is in contact with the load cell 12 in a manner which allows the adjustment of the temperature of the load cell 12 to either its martensite phase or its austenite phase. Finally, the temperature monitoring device 18 is in contact with the load cell 12 in a manner which allows the measurement of the temperature of the load cell 12 to determine if the load cell 12 is in either the martensite or the austenite phases.

Load cells capable of use in the present invention may be constructed or shaped according to their desired use. The construction and various shapes of commonly used load cells are well known in the art and described generally in "Load Cells," *Strain Gauge Based Transducers: Their Design and Construction,* (Measurements Group, Inc., 2 d ed. 1988), incorporated herein by reference. Preferably, however, the load cell is shaped in a manner which allows the focusing of the effect of the applied contact force to an isolated and uniform strain field where gauges for the strain sensing system are placed for load measurement. Implicit in this is that the flexure in the gauged area responds in a linear-elastic manner to the applied load.

Load cells utilized in the present invention are made using a shape memory alloy material having both a martensite phase and an austenite phase. A wide range of shape memory alloys exhibiting the shape memory phenomenon are well known in the art and include, without limitation, NiTi, CuZn, CuZnAl, CuZnGa, CuZnSn, CuZnSi, CuAINi, CuAuZn, CuSn, AuCd, AgCd, NiAI, and FePt, among others. Preferably, the shape memory alloy utilized is a NiTi alloy. Most preferably, the NiTi alloy has a concentration approximate to 55% nickel and 45% titanium.

The ability of the shape memory alloy to exhibit large changes in its elasticity, as well as its ability to recover from certain plastic deformations, are important to the specific load cell design. The particular type of shape memory alloy should be selected according to the specific mechanical properties desired. For example, the temperature at which the transition from a martensite phase to an austenite phase, and the magnitude of strain recoverable varies with the composition of the particular alloy employed. Also, small amounts of impurities added to an alloy can drastically change the alloy's mechanical properties and eliminate its ability to function according to the requisites of the present invention. Hence, careful control of trace elements is required to obtain the desired properties. To provide enhanced sensing capabilities an alloy is selected which is capable of exhibiting linear elastic deformation of approximately 1% in both phases.

The temperature modulating system is intended to adjust the temperature of the shape memory alloy in the load cell so as to place the load cell in either the martensite phase or the austenite phase. Preferably, the temperature modulating system includes, but is not limited to, a device which is capable of rapidly heating and cooling the load cell to reach and maintain the shape memory alloy in both the martensite and austenite phases, or capable of heating the load cell to the austenite phase and then allowing the load cell to cool by allowing the natural escape of heat into the surrounding environment. Such devices are commonly known in the art and include, without limitation, thermoelectric devices.

In the preferred embodiment a thermoelectric heating and cooling device is the main component employed in the temperature modulating system. The use of a thermoelectric heating and cooling device is preferred because it quickly adjusts the load cell temperature to the appropriate phase range for the particular alloy employed. Quick temperature adjustments provide the sensor with the capacity to make quick and accurate force measurements. A quick and accurate force measurement allows a robotic manipulator, or other application employing a force sensor of the present invention, to react immediately to the contact force without waiting for a temperature adjustment. The ability to react immediately to a force is likely to avoid potential damage caused by shock loads or overloading.

The temperature monitoring system employed in the present invention includes, without limitation, any system capable of providing a measurement of the load cell's temperature. Preferably the temperature monitoring system employed includes one or more thermocouples connected to a terminal which provides a temperature output signal. It is anticipated, however, that any other temperature monitoring system may be utilized in the present invention and will depend primarily upon the size and weight limitations desired by those intending to practice the invention.

The strain sensing system is generally defined as a system which is capable of measuring the induced strain placed upon the load cell by an applied contact force. Many such strain sensing systems are commonly known amongst those who commonly use or manufacturer force sensors. Preferably, however, the strain sensing system employed includes, without limitation, a series of strain gauges attached along the load cell in strain fields capable of providing load measurements characterized by an unvarying, proportional relationship between the strain and the load. The particular strain gauge utilized will generally depend upon the type of alloy employed, the desired sensitivity of the force sensor, and the temperature ranges experienced by the load cell.

Figure 2:
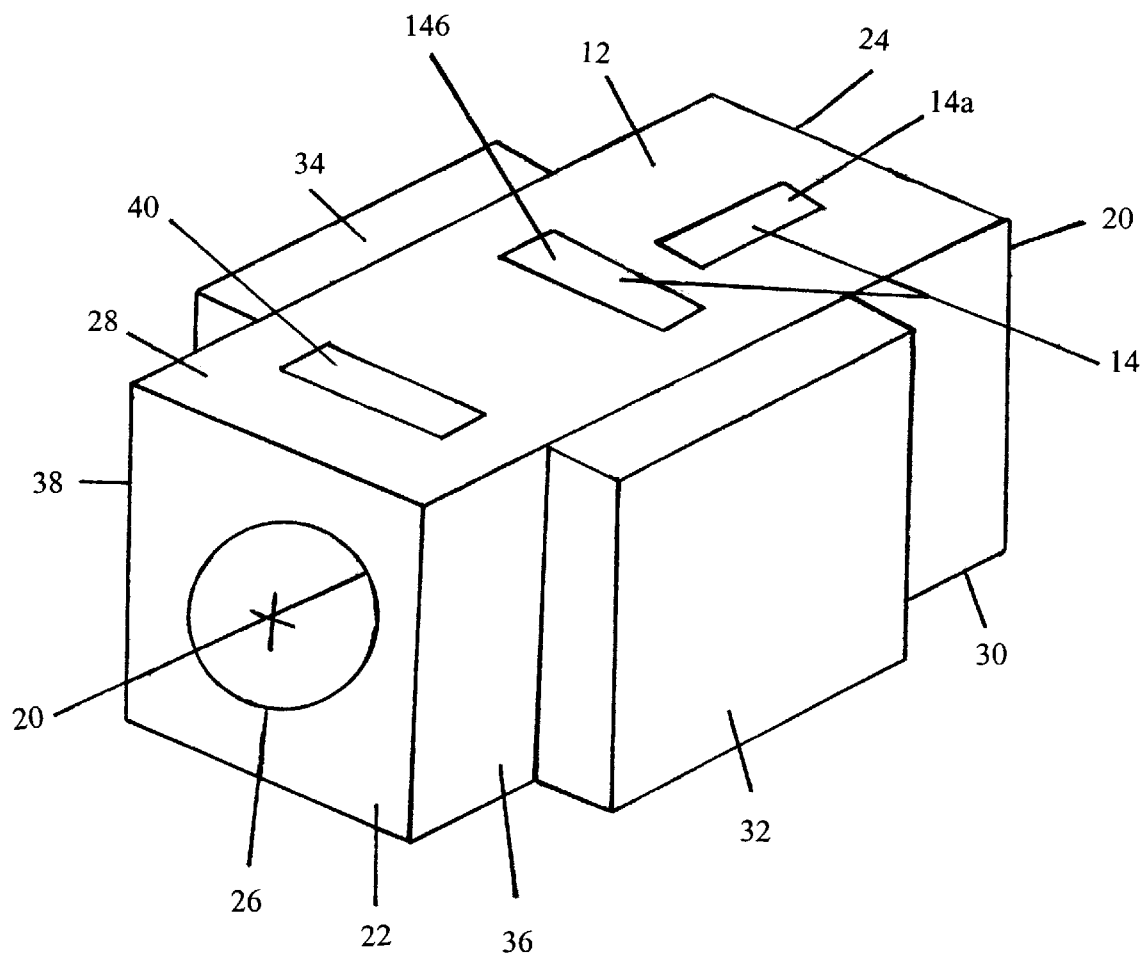
FIG. 2 is an illustration of a force sensor according to one embodiment of the present invention wherein the load cell is a column load cell.

In the specific embodiment illustrated in FIG. 2, the load cell 12 is made of a shape memory alloy and constructed in the form of a square prism having a longitudinal axis 20 passing centrally through a first square end 22 and a second square end 24 of the load cell 12. A hole 26 having a diameter approximately ⅝ the length of the sides of the square ends 22 and 24 is drilled along the longitudinal axis 20 and through the length of load cell 12, and is intended to reduce the surface area and thermal mass of the load cell 12 while maintaining the rigidity of the structure in bending.

The strain sensing system 14 measures the flexure induced in the load cell 12 by a contact force applied to the load cell along its longitudinal axis 26, and is created by attaching strain gauges 14*a* and 14*b* to one side 28 of the load cell 12 and two matching strain gauges, not shown, to its opposing side 30 in a manner which allows strain measurement. The strain gauges 14*a*, 14*b* and their two matching strain gauges, not shown, are connected to form an electrical wheatstone bridge.

Two thermoelectric heating and cooling devices 32 and 34 are connected to the load cell 12 along sides 36 and 38, respectively. The thermoelectric heating and cooling device 32 and 34 increase and decrease the temperature of the load cell to either its martensite or austenite phases, and are turned on and off based upon the input from the temperature monitoring system. The temperature monitoring system comprises two thermocouple sensors 40 and 42 (not shown) connected to the load cell 12 along sides 28 and 30. The thermocouples 40 and 42, provide a voltage proportional to its contact temperature which is used by the controller to regulate the input voltage to the thermoelectric heating and cooling devices 32 and 34.

In its operation, the force sensor 10 is placed in a position on an apparatus where it will be subjected to contact forces along its longitudinal axis 20. As a contact force is applied to the force sensor 10, the load cell 12 focuses the strain induced by the force into the strain fields where the strain gauges 14a, 14b, and two not shown, are located. The change in the strain field, in turn, causes a change in the resistance across the strain gauges 14a, 14b, and two not shown, which is measured according to the change of an output signal across the electrical wheatstone bridge, of which the strain gauges 14a, 14b, and two not shown, are a part. The output signal is then conditioned by dedicated electronic filters, not shown, to eliminate any electronic noise, and gains are used in both computer hardware and software, not shown, to obtain a measurable signal and to determine the force, or load, applied during the application.

Prior to the application of the contact force, the thermoelectric heating and cooling devices 32 and 34 are activated to adjust the temperature of the load cell 12 to either its martensite or austenite temperature range. At the same time, thermocouples 40 and 42 are activated to continue to monitor the temperature of the load cell to ensure proper temperature adjustment and operation. The adjustment to either the martensite or austenite temperature range is controlled by a computer system, not shown, having the anticipated force level of the contact force programmed in accordance with each activity of the apparatus.

Figure 3:
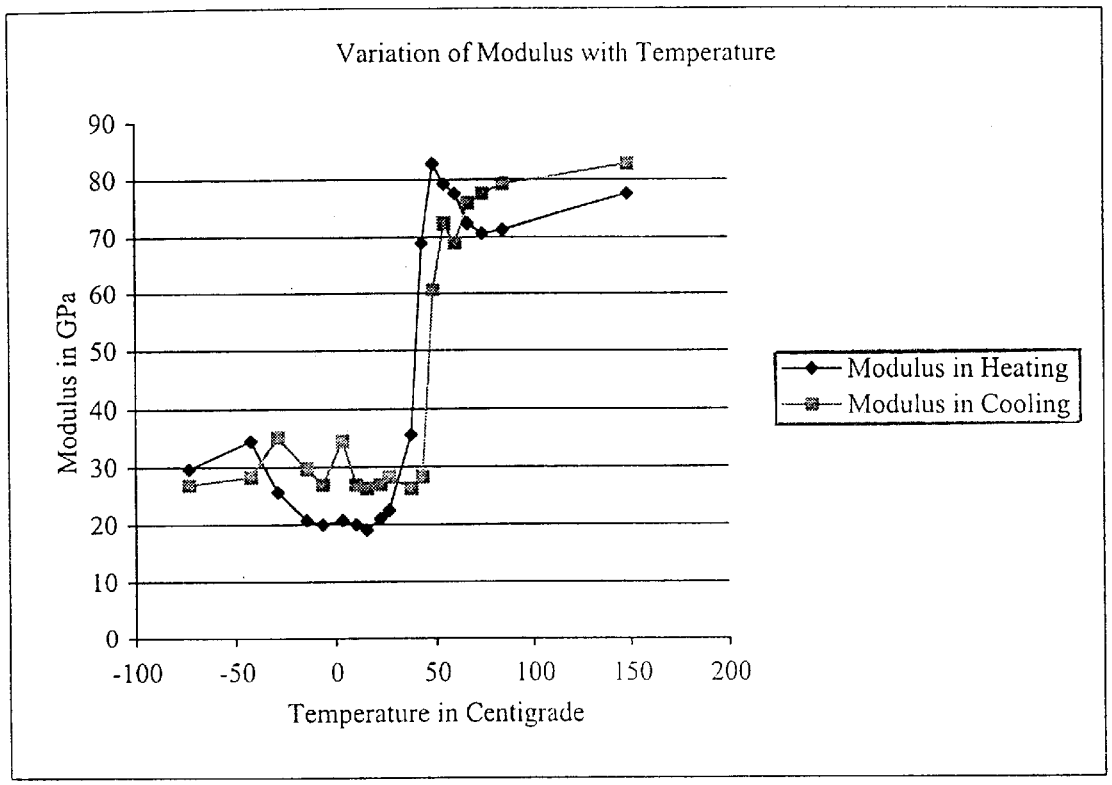
FIG. 3 is a graph illustration of the phase transition of a shape memory alloy.
Figure 4:
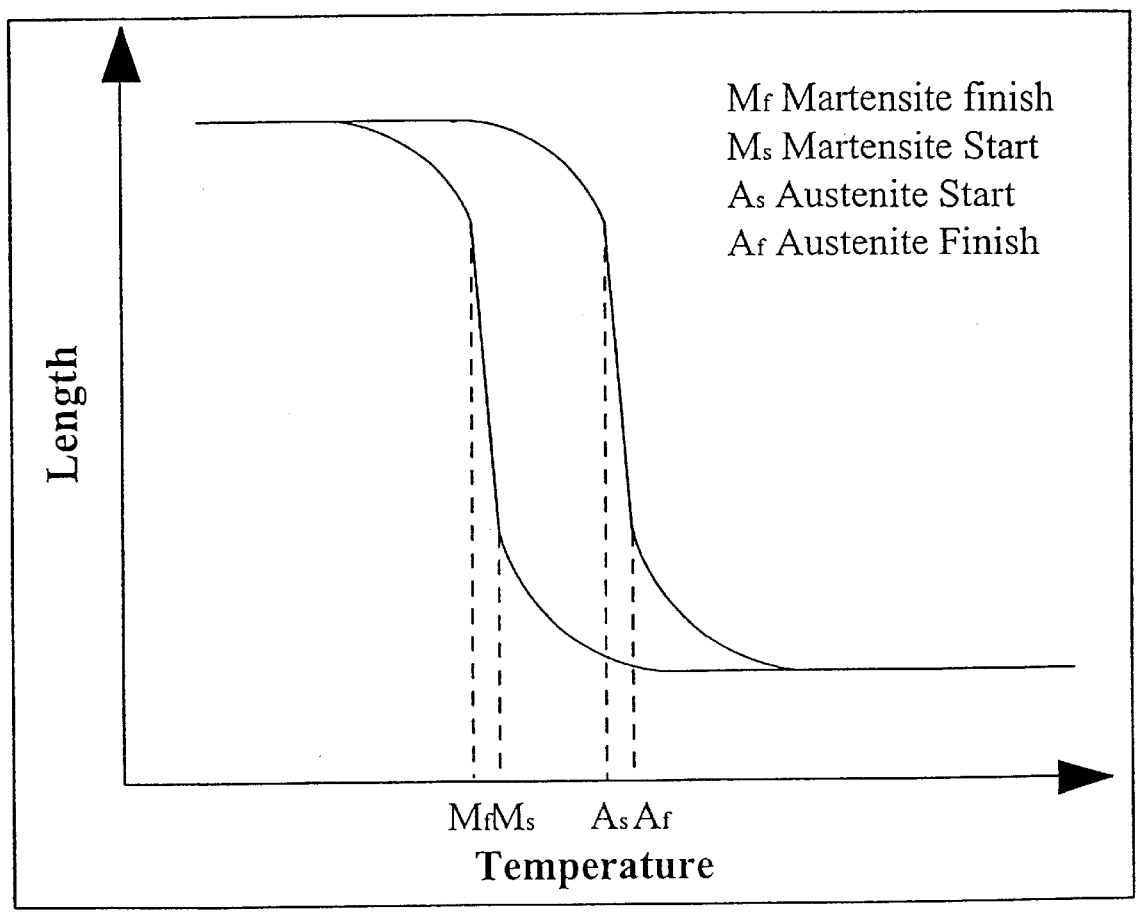
FIG. 4 illustrates graphically the variation in Young's Modulus of Elasticity for a nickel titanium (NiTi) shape memory alloy during cooling and heating.

The phase transformation between the martensite and the austenite phases has a steep slope and takes place relatively quickly during the temperature change, as shown in FIG. 4. Dependant upon the material property of the alloy, the load cell can be held in either the martensite or the austenite phase over a relatively large temperature range of 10° F. to 40° F. FIG. 3. (Zhang et al. "Modeling of Two-Way Shape Memory Effect," *Symposium on Smart Structures and Materials,* 1991 *ASME Winter Annual Meeting,* 79–90 (ASME, N.Y. 1991)). During the phase change the modulus of elasticity of the load may also change by an order of 10 for the same shape memory alloy. FIG. 3. Hence, by operating the sensor at two different phases of its operation, the available strain is maintained. This will result in improved sensitivity of the sensor.

A force sensor developed according to the present invention will have the full range of available strain in both the austenitic and martensite phases. Unlike conventional sensors, the full scale readings in both high and low ranges are the maximum allowable strains. For example, the relationships $\sigma_m = E_m \epsilon_m$ and $\sigma^a = E_a \epsilon_a$ denote the stress-strain relation for the martensite and austenite phases respectively (where $\sigma$, $\epsilon$, E denote the stress, strain and modulus of elasticity for the material phase). Since $E_a$ is r (®<1) times $E_m$ for the same strain ($\epsilon_a = \epsilon_m$), the stress $\sigma_m = r\sigma_m$. Therefore, when the operating range is reduced by a factor of r, the induced strain remains the same. However, in commercial sensors, when the operating range is reduced by a factor of r, the strain obtained is also reduced by the same amount. Two separate sensors would be needed to provide adequate sensitivity over these different operating ranges. The increase in the available strain resulting from the change in mechanical properties of the shape memory alloy enables the disclosed force sensor to operate at greater sensitivity in multiple ranges. In addition, when operating in the martensite phase, a plastic deformation of up to 8.5% is reversible by heating the sensor to austenite phase and cooling thereby providing extra overload protection capability.

EXAMPLE

A force sensor was constructed having a load cell made of a shape memory alloy material containing 55.14% nickel (Ni) and 44.86% titanium (TI). The load cell was constructed in the shape of a square prism having the dimensions 29 mm×29 mm× 76.2 mm. A 25 mm hole was drilled through the center of the prism and along its longitudinal axis to reduce the surface area and thermal mass of the load cell, while maintaining its rigidity in bending.

The sensor was constructed by attaching strain gauges to the sides. In total four strain gauges were used to form the wheatstone bridge. Two placed in an axial direction and two in the lateral. A 350 Ω strain gauge with a gauge factor of 2.09 from Measurements Group, Inc., was used for the sensor development. To reduce the resistance from the connecting wires, silver coated copper was used to make the electrical connection. To heat the sensor and to change the NiTi alloy to its austenite phase, thermoelectric heaters were employed. The thermoelectric heaters chosen had a thermal output of 12.65 watts. Two thermoelectric heaters were used for heating the sensors and two thermocouples were used to measure the temperature. The average value of the reading from the two thermocouples was used for the controlling of the sensor. TTL signals from the computer were used to control the power input to the thermoelectric to control the temperature. Both Bang-Bang and proportional controllers were used for temperature control. The temperature could be controlled up to an accuracy of 0.2° C.

I claim:

1. A force sensor having two measurement ranges, said force sensor comprising a load cell made of a shape memory alloy, a strain sensing system including a sensor attached to the load cell that deforms in response to a contact force placed upon the load cell to allow measurement of the contact force, a temperature modulation system that actively heats and cools the shape memory alloy, the temperature modulation system being in contact with the load cell to allow adjustment of the temperature of the load cell so as to place the shape memory alloy in either a martensite phase for measuring contact forces in a first range or an austenite phase for measuring contact forces in a second range, such that in the martensite phase the load cell is capable of measuring contact forces in the first range, and in the austenite phase the load cell is capable of measuring contact forces in the second range, and a temperature monitoring system in contact with the load cell to allow measurement of the temperature of the load cell.

2. The force sensor of claim 1 wherein the load cell is made of a shape memory alloy selected from the group consisting of CuZn, CuZnAl, CuZnGa, CuZnSn, CuZnSi, CuAlNi, CuAuZn, CuSn, AuCd, AgCd, TiNi, NiAl, and FePt.

3. The force sensor of claim 1 wherein the temperature modulating system comprises one or more thermoelectric heaters.

4. The force sensor of claim 1 wherein the temperature monitoring system comprises one or more thermocouples.

5. The force sensor of claim 1 wherein the strain sensing system comprises one or more strain gauges.

6. A force sensor having two measurement ranges, said force sensor comprising a load cell made of a shape memory alloy, one or more strain gauges attached to the load cell to measure an induced strain placed upon the load cell by a contact force, one or more thermoelectric heaters in contact with the load cell to allow active adjustment of the temperature of the load cell so as to place the shape memory alloy in either a martensite phase for measuring induced strains of a first range or an austenite phase for measuring induced strains of a second range, such that in the martensite phase the load cell is capable of measuring contact forces in the first range, and in the austenite phase the load cell is capable of measuring contact forces in the second range, and one or more thermocouples in contact with the load cell to monitor the temperature of the load cell.

7. The force sensor of claim 6 wherein the shape memory alloy is selected from the group consisting of CuZn, CuZnAl, CuZnGa, CuZnSn, CuZnSi, CuAlNI, CuAuZn, CuSn, AuCd, AgCd, TiNi, NiAl, and FePt.

8. A force sensor having two measurement ranges, said force sensor comprising a load cell made of a shape memory alloy, one or more strain gauges attached to the load cell to measure an induced strain placed upon the load cell by a contact force, one or more thermoelectric heats and cooling devices in contact with the load cell to allow active adjustment of the temper of the load cell so as to place the shape memory alloy in either a martensite phase for measuring induced strains of a first range or an austenite phase for measuring induced strains of a second range, such that in the martensite phase the load cell is capable of measuring contact forces in the first range, and in the austenite phase the load cell is capable of measuring contact forces in the second range, and one or more thermocouples in contact with the load cell to monitor the temperature of the load cell.

9. The force sensor of claim 8 wherein the shape memory alloy is selected from the group consisting of CuZn, CuZnAl, CuZnGa, CuZnSn, CuZnSi, CuAlNi, CuAuZn, CuSn, AuCd, AgCd, TiNi, NiAl, and FePt.

* * * * *

UNITED STATES PATENT AND TRADEMARK OFFICE
CERTIFICATE OF CORRECTION

PATENT NO. : 6,546,806 B1
DATED : April 15, 2003
INVENTOR(S) : Venugopal K. Varma It is certified that error appears in the above-identified patent and that said Letters Patent is hereby corrected as shown below:

Column 1,
Line 28, delete comma (,) from "forces, typically".
Line 32, "to quality" should be -- to assure quality --.

Column 2,
Line 45, delete hyphen (-) from "alloys-to".

Column 3,
Line 33, "modem" should be -- modern --.

Column 5,
Line 16, no space between "2 d" should be -- 2d --.
Line 29, "CuAINi" should be -- CuAlNi --.
Line 30, "NiAI" should be -- NiAl --.

Column 7,
Line 46, "$\sigma^a = E_a \epsilon_a$" should be -- $\sigma_a = E_a \epsilon_a$ --

Column 9,
Line 7, "CuAlNI" should be -- CuAlNi --.
Line 13, "heats" should be -- heating --.
Line 15, "temper" should be -- temperature --.

Signed and Sealed this

Sixteenth Day of December, 2003

JAMES E. ROGAN
*Director of the United States Patent and Trademark Office*